Patented June 22, 1943

UNITED STATES PATENT OFFICE 2,322,638

MOLD AND MOLD COMPOSITION

Francis S. Kleeman, Pittsburgh, Pa., assignor to Westinghouse Electric & Manufacturing Company, East Pittsburgh, Pa., a corporation of Pennsylvania No Drawing. Application July 31, 1942, Serial No. 453,035

8 Claims. (Cl. 22—188)

This invention relates to molds, and particularly to foraminous molds and mold compositions.

Heretofore many attempts have been made to produce foraminous molds and many suggestions have been made for increasing the porosity of existing mold material. Such porosity is desirable and necessary in order that air and gas will exude through the walls of the mold cavity during the pouring of metal into the mold.

Sand molds are known to be somewhat porous but it has been impossible to obtain smooth surfaces with such material. Recently a gypsum mold has been produced having a fair degree of porosity, but such material is limited in strength as well as being limited in use, since it has been found impossible to employ such gypsum molds for the pouring of ferrous metals.

It is an object of this invention to provide a foraminous foundry mold.

Another object of this invention is to provide a foraminous foundry mold consisting mainly of silica flour and a binder.

A more specific object is to provide a foundry mold composition suitable for the making of a foraminous mold.

Other objects of this invention will become apparent from the following description when taken in conjunction with the appended claims.

In practicing this invention, a mixture of silica flour, water glass and pitch, to which a predetermined amount of water is added, is utilized as the basic mold composition. In general, the composition comprises a mixture of from 65% to 95% silica flour having a very fine particle size, from 4% to 18% water glass and from 2% to 18% pitch, and from 8 to 17 parts of water added to 100 parts of the mixture. Preferably the silica flour employed has such a fineness that 90 to 95% of the flour passes through a 270 mesh sieve with the balance passing through a 200 mesh sieve. The pitch also has a fine particle size being of the order of between 100 and 200 mesh.

The water glass acts as a binder for the silica flour while the pitch, either coke or petroleum pitch, is utilized for rendering the resulting mold porous. Preferably, the mold composition consists of a mixture of 65% to 85% silica flour, 5% to 18% of water glass and 5% to 18% pitch with from 8 to 17 parts of water added to 100 parts of the mixture.

The very fine grain size of the silica flour is necessary in order to produce a mold having an extremely smooth surface or skin. The water glass binder imparts strength to the mold, it being found that where less than 4% water glass is employed that the resulting mold crumbles and flakes. The strength of the mold is greatly increased by increasing the amount of binder employed although 18% of water glass appears to be the maximum which can be satisfactorily utilized and still retain the required porosity in the mold without undue shrinkage during the baking of the mold as described hereinafter.

The limits of the range of the water glass content given hereinbefore are established for a 32% sodium silicate solution, such solution being readily obtained on the open market. Of course, it is understood that if the concentration of the sodium silicate solution is varied that the limits of the water glass content of the composition will vary accordingly, smaller quantities of water glass being necessary where the solution is more concentrated.

The mixture of silica flour, water glass and pitch within the ranges given is preferably well mixed, after which from 8 to 17 parts of water are added to 100 parts of the mixture. The resulting composition is fairly dry and is well agitated, as by stirring or otherwise mixing, to obtain a homogeneous composition which can be rammed in a flask containing a pattern to produce a green mold having good strength and reproduction of pattern detail. The ramming of the mold composition can be by hand or under pressure, it being noted that the best reproduction of detail of the pattern is obtained where the mold composition is rammed under pressure as high as four tons to the square inch.

After ramming the mold composition in the flask, the flask is readily removed and the green mold is then placed in a suitable oven and subjected to a temperature preferably between 500° C. and 760° C. for a period of time of ½ to 5 hours to free it of all volatile matter. Lower temperatures down to about 300° C. can however be employed provided that the baking time is correspondingly increased. Preferably, the green mold is baked on grids in a furnace with the grids having a minimum contact supporting surface, low expansion and contraction characteristics and good strength at temperatures up to the baking temperature. In baking the mold, it is preferably heated up to the baking temperature in steps beginning as low as 100° C. and cooled in steps from the baking temperature in the furnace in steps to about 200° C. before exposing it to the room atmosphere. A heating and cooling rate of about 20° C. per minute gives good results, it being found that faster rates cause small cracks to form in the mold. In general, a baking time of ¾ of an hour per inch of mold thickness is required at a baking temperature of 760° C. During the baking substantially all of the volatile constituents of the homogeneously distributed pitch and the volatile constituent of the sodium silicate solution are driven off leaving a homogeneously distributed network of voids throughout the mold.

In order to insure against sticking of the cast metal in the mold, it is preferred to apply a thin film of a mold wash to the mold. The mold wash may be applied by spraying or brushing the mold. A mold wash of plumbago blackening (1% to 10% plumbago with 99% to 90% commercial alcohol) or of linseed oil and turpentine is easily sprayed on the surface of the mold, or dry plumbago may be brushed directly onto the surface of the mold. The mold wash is preferably applied to the green mold so that the normal baking of the green mold will remove all volatile matter from the wash. However, the wash may be applied to the mold after the baking treatment in which case it is then necessary to subject the sprayed mold to another baking treatment at a temperature of about 200° C. for a period of time of about 1 hour to insure the removal of all volatile matter. Good castings have been produced from all such prepared molds.

As examples of different mold compositions, the constituents of which are within the range given hereinbefore and the results obtained after baking to remove the volatile constituents reference may be had to the following table:

gases through the mold walls during the pouring of a casting.

Since the composition has a relatively low moisture content, it is possible to bake the rammed green mold quite rapidly without excessive thermal shock being encountered. Because of the fineness of the pitch and the fineness of the silica flour employed as the base of the molding composition, it is possible to obtain an extremely smooth surface on the mold which facilitates the making of good castings. Further, the molds produced in accordance with this invention can be employed in the casting of many different types of metals, including the ferrous metals as well as the non-ferrous metals.

The materials involved in making the mold of this invention are relatively inexpensive comparing favorably with the cost of the known compositions on both weight and volume basis. Further, it is possible to reclaim the molding composition of this invention after it has been employed in the casting of metals, such reclaiming being readily accomplished by pulverizing the used mold stock to a fineness where it passes through a 270 mesh sieve and then adding water glass and pitch and water in predetermined amounts, after which the composition may be rammed to again form a green mold and baked to drive off the volatile matters and provide the foraminous structure.

Although this invention has been described with reference to a particular embodiment thereof, it is, of course, not to be limited thereto except insofar as is necessitated by the scope of the appended claims.

| Mix No. | Composition | | | | Data on baked mold | | | |
|---|---|---|---|---|---|---|---|---|
| | Silica flour | Water glass | Pitch | Water | Dry permeability | Dry shear | Mold hardness (Dietert test) | Specific gravity |
| | Per cent | Per cent | Per cent | Parts | | Lbs./sq. in. | | |
| 18 | 85 | 10 | 5 | 15 | 14 | 70 | 100 | 1.16 |
| 19 | 75 | 15 | 10 | 10 | 17 | 57.9 | 100 | 1.08 |
| 19A | 75 | 15 | 10 | 15 | 30 | Over 70 | 100 | 1.11 |
| 20 | 75 | 10 | 15 | 15 | 28 | 13.2 | 98 | 0.91 |
| 21 | 70 | 15 | 15 | 15 | 35 | 45.8 | 99 | 0.96 |
| 22 | 70 | 15 | 15 | 10 | 53 | 65 | 99 | 0.99 |

The baked molds have excellent physical characteristics and permeability. The dry permeability listed in the table is the number of cubic centimeters of air which it is possible to pass through the baked mold per minute as found by the standard AFA permeability test, and is an excellent indication of the amount of voids present in the baked mold.

Although the results listed in the table are based on the baked mold, the green mold composition also has excellent strength. As indicative of the strength of the green mold, reference may be had to the shear and compression strength of the green mold composition identified in the foregoing table as mix No. 22. This particular mix had a green shear strength of 2 lbs. per square inch and a green compression strength of 9.6 lbs. per square inch. Comparable results can be obtained with other compositions within the range given hereinbefore.

The mold and mold composition of this invention makes it possible to produce smooth castings in minute detail within tolerances of a few thousandths of an inch. Further, since the strength of the baked material is extremely high, it is possible to form molds having very thin walls thereby further facilitating the escape of air or

I claim as my invention:

1. A foundry mold composition comprising, a mixture of 65% to 95% silica flour, 4% to 18% water glass, and 2% to 18% pitch, and from 8 to 17 parts of water added to 100 parts of the mixture.

2. A foundry mold composition comprising a mixture of 65% to 95% silica flour, the silica flour having a predominating particle size not larger than 270 mesh, 4% to 18% water glass, and 2% to 18% pitch, and from 8 to 17 parts of water added to 100 parts of the mixture.

3. A foundry mold composition comprising, a mixture of 65% to 85% silica flour, 5% to 18% of a 32% sodium silicate solution, and 5% to 18% pitch, and from 8 to 17 parts of water added to 100 parts of the mixture.

4. A foundry mold composition comprising, a mixture of 65% to 85% silica flour, the silica flour having a predominating particle size not larger than 270 mesh, 5% to 18% of a 32% sodium silicate solution, and 5% to 18% pitch, and from 8 to 17 parts of water added to 100 parts of the mixture.

5. A foundry mold composition consisting of

70% silica flour, 15% of a 32% sodium silicate solution, and 15% pitch, and 10 parts of water added to 100 parts of the mixture.

6. A mold comprising, a foraminous body composed of the residue of a mixture of 65% to 95% silica flour, 4% to 18% water glass and 2% to 18% pitch, and 8 to 17 parts of water to 100 parts of the mixture, treated at an elevated temperature to remove the volatile matter therefrom, the residue being substantially homogeneous in composition and having voids distributed substantially evenly therethrough.

7. A mold comprising, a foraminous body composed mainly of silica flour bonded by sodium silicate, the foraminous body being formed by subjecting a rammed mixture of 65% to 85% silica flour, 5% to 18% of a 32% sodium silicate solution and 5% to 18% pitch, and 8 to 17 parts of water to 100 parts of the mixture, to a temperature between 500° C. and 760° C. for a period of time of ½ to 5 hours.

8. A mold comprising, a foraminous body composed mainly of silica flour and sodium silicate as a binder therefor, the foraminous body being formed from a mixture of 70% silica flour, 15% of a 32% sodium silicate solution, and 15% pitch, and 10 parts of water added to 100 parts of the mixture, rammed to the predetermined shape of the mold and subjected to a temperature between 500° C. and 760° C. for a period of time of ½ to 5 hours, the foraminous body being substantially homogeneous throughout and having a smooth skin.

FRANCIS S. KLEEMAN.